(No Model.)
T. MIDGLEY.
HOSE OR TUBING.
No. 398,425. Patented Feb. 26, 1889.
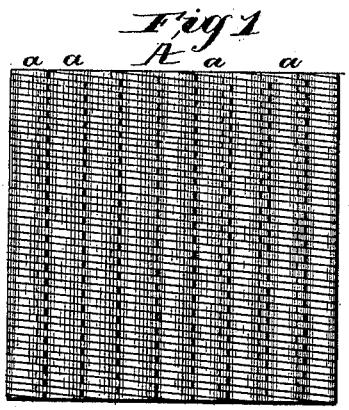
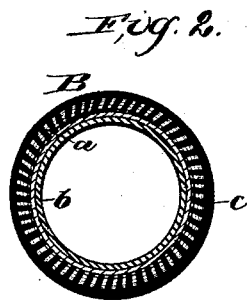
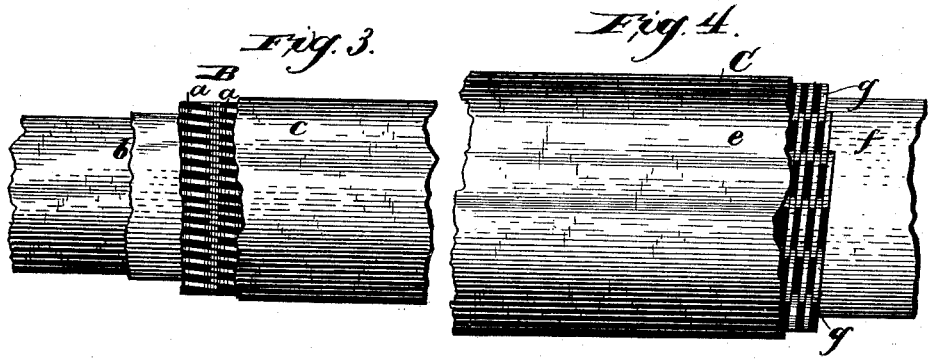
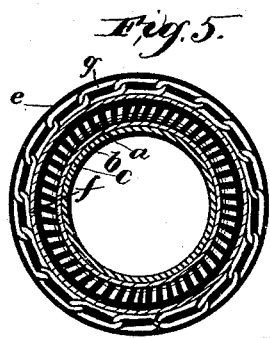
Witnesses—
Wm. H. Scott
M. A. Reinohl
Inventor,
Thomas Midgley
By Johnston, Reinohl & Dye
Attorneys

UNITED STATES PATENT OFFICE.

THOMAS MIDGLEY, OF BEAVER FALLS, PENNSYLVANIA, ASSIGNOR OF ONE-HALF TO JAMES E. EMERSON, OF SAME PLACE.

HOSE OR TUBING.

SPECIFICATION forming part of Letters Patent No. 398,425, dated February 26, 1889.

Application filed July 14, 1888. Serial No. 279,932. (No model.)

*To all whom it may concern:*

Be it known that I, THOMAS MIDGLEY, a citizen of the United States, residing at Beaver Falls, in the county of Beaver and State of Pennsylvania, have invented certain new and useful Improvements in Hose or Tubing; and I do hereby declare the following to be a full, clear, and exact description of the invention, such as will enable others skilled in the art to which it appertains to make and use the same.

My invention relates to hose or tubing, and has for its object the construction of hose of great strength for hydraulic mining, firemen's service, steam-heating, air-brakes, pneumatic mining, and any other purpose in which high pressure is required. The invention has special reference to an improvement on the hose shown and described in Patents Nos. 386,306 and 386,307, bearing date of July 17, 1888, and will be hereinafter described, and particularly pointed out in the claims.

In the accompanying drawings, which form part of this specification, Figure 1 represents a plan view of a section of wire-cloth; Fig. 2, an end view of the same bent into the form of a tube; Fig. 3, a side elevation thereof, partly in section; Fig. 4, a similar view of a tube for surrounding that shown in Fig. 3; and Fig. 5 is a cross-section of the two tubes, one being within the other.

Reference being had to the drawings and the letters thereon, A indicates a section of cloth composed of a series of sections, $a$, of coiled-wire helices twined together by screwing one section into another until a body of any desired length and width has been formed. The wire-cloth is then heated and stretched until the coils or helices have been flattened and elongated into links, as shown. The cloth when stretched is of a width corresponding with the circumference of the tube to be made from it. After having been stretched, the wire-cloth is covered on one side with rubber and canvas, $b$, and on the other side with rubber, $c$, alone, and of sufficient thickness to fill the interstices and cover the links; or both sides may be covered with rubber alone or its equivalent. The wire-cloth thus coated is then passed between rolls heated sufficiently to cause the rubber to flow or adhere to and incorporate itself in the body of the wire, to protect it against the corrosive effect of the fluids which may be conducted through the hose when completed. The wire-cloth thus treated is then bent around a mandrel of suitable diameter and the edges brought together and secured, and an inner tube, B, formed. This tube is then surrounded by an outer tube, C, of wire helices, previously galvanized or covered with rubber, as shown at $e\,f$ in Figs. 4 and 5. After the two tubes have been thus placed one within the other, they are subjected to heat to vulcanize and cause the outer rubber surface of the inner tube, B, to unite with the inner surface of the outer tube, C, and form a compact body or hose, in which the links $a$ of the inner tube run in the direction of the length of the hose, and the links $g$ in the outer tube run in the direction of the circumference of the hose. By this construction the strength of the hose is equalized, the inner tube providing for longitudinal strain and the outer tube for circumferential or lateral strain.

The hose thus produced is capable of resisting great internal and external pressure, while it is sufficiently flexible to permit its being wound upon a reel.

Having thus fully described my invention, what I claim is—

1. Hose or tubing consisting of an inner and an outer tube in which the intertwined links or helices run at right angles to each other, and one of said tubes is coated or covered with rubber or equivalent material, substantially as described.

2. Hose or tubing composed of an inner tube, in which the intertwined links or helices run in the direction of the length of the hose, and are covered with rubber, and an outer tube, in which the intertwined links or helices run in the direction of the circumference of the hose, substantially as described.

3. Hose or tubing composed of an inner tube of intertwined helices and a covering on both sides of rubber or equivalent materal, and an outer tube of intertwined helices which run at a right angle to the helices of the inner tube and are covered with rubber or equivalent material, substantially as described.

In testimony whereof I affix my signature in presence of two witnesses.

THOMAS MIDGLEY.

Witnesses:
J. F. MERRIMAN,
WM. C. GALTON.